United States Patent [19]

Kato et al.

[11] Patent Number: 5,557,288

[45] Date of Patent: Sep. 17, 1996

[54] ANTENNA HOUSING WITH EXTENDABLE DRAWER FOR A PORTABLE COMPUTER

[75] Inventors: Naotaka Kato, Ayase; Katsutoshi Katoh, Tokyo, both of Japan

[73] Assignee: International Business Machines Corporation, Armonk, N.Y.

[21] Appl. No.: 524,977

[22] Filed: Sep. 7, 1995

[30] Foreign Application Priority Data

Sep. 7, 1994 [JP] Japan .................................. 6-213508

[51] Int. Cl.⁶ .................................................. H01Q 1/24
[52] U.S. Cl. .................................... 343/702; 343/895
[58] Field of Search .................................. 343/702, 895, 343/900, 904, 846; H01Q 1/24, 1/38

[56] References Cited

U.S. PATENT DOCUMENTS 5,361,061 11/1994 Mays et al. ........................ 343/702
5,373,149 12/1994 Rasmussen ........................ 235/492

FOREIGN PATENT DOCUMENTS 24723 10/1994 WIPO ........................ H01Q 1/24

*Primary Examiner*—Hoanganh Le

[57] ABSTRACT

A drawer (70) and antenna (e.g., 78) can be extended from a computer for wireless communications, and retracted when not in use. The antenna and its circuit board (56) are slidably attached to the drawer, which is slidably attached to an antenna housing (30) located within the computer. A door (74) is pivotally attached to a bottom plate (60) of the drawer to cover a slot (40) in the side of the computer. For wireless communications, the antenna, circuit board and drawer are extended through the slot and project out the side of the computer. The bottom plate, door and a cover over the circuit board function as a ground plane for the antenna. The effective dimensions of the ground plane can be varied by sliding the circuit board relative to the drawer.

2 Claims, 10 Drawing Sheets

5,557,288

ANTENNA HOUSING WITH EXTENDABLE DRAWER FOR A PORTABLE COMPUTER

BACKGROUND OF THE INVENTION

Applicants claim the foreign priority benefits under 35 U.S.C. 119 of Japanese Application No. 6-213508 filed Sep. 7, 1994. This Japanese Application and its translation are incorporated by reference into this Application.

This invention pertains to computers and other data processing systems and, more particularly, to such data processing systems that employ wireless communications. More specifically, this invention pertains to an antenna housing and drawer that can be extended from and retracted into a portable computer or other data processing apparatus.

As illustrated in FIG. 9, there are some personal computers 96 that have an antenna 90 for wireless communication. In order to accommodate the antenna 90 at the corner of the cover 88, which includes a display 86, an auxiliary housing 92 must be attached to a vertical edge of the cover, thereby increasing that thickness of the cover. When the cover 88 is closed, the auxiliary housing 92 projects outwardly from the body 94 and impacts the appearance of the computer. If the antenna 90 requires a ground plane, a ground plane of appropriate size must be located directly beneath the antenna, otherwise the communication range will be very limited. Therefore, it is undesirable to install an antenna that requires a ground plane on the cover of a personal computer.

As illustrated in FIG. 10, there is another antenna structure wherein the antenna 90 is attached to the ground plane 100 which is fixed to the side face of the case frame 98. When the antenna 90 is not used, however, the ground plane 100 interferes with the operation and use of the computer 96.

Therefore, it would be desirable to have a new antenna housing design whereby the antenna can be retracted within the body of a computer or other data processing apparatus when not in use.

SUMMARY OF THE INVENTION

Briefly, the invention is a computer having a wireless communication system. The computer includes a computer housing having an opening and a drawer slidably attached to housing. The drawer has an extended position projecting outwardly from the housing, and a retracted position within the housing. The drawer passes through the opening in the housing when the drawer is moved from the retracted to the extended position. An antenna is attached to the drawer. The antenna is positioned exterior to the housing when the drawer is in the extended position, and within the housing when the drawer is in the retracted position.

DESCRIPTION OF THE ILLUSTRATIVE EMBODIMENTS

Figure 1:
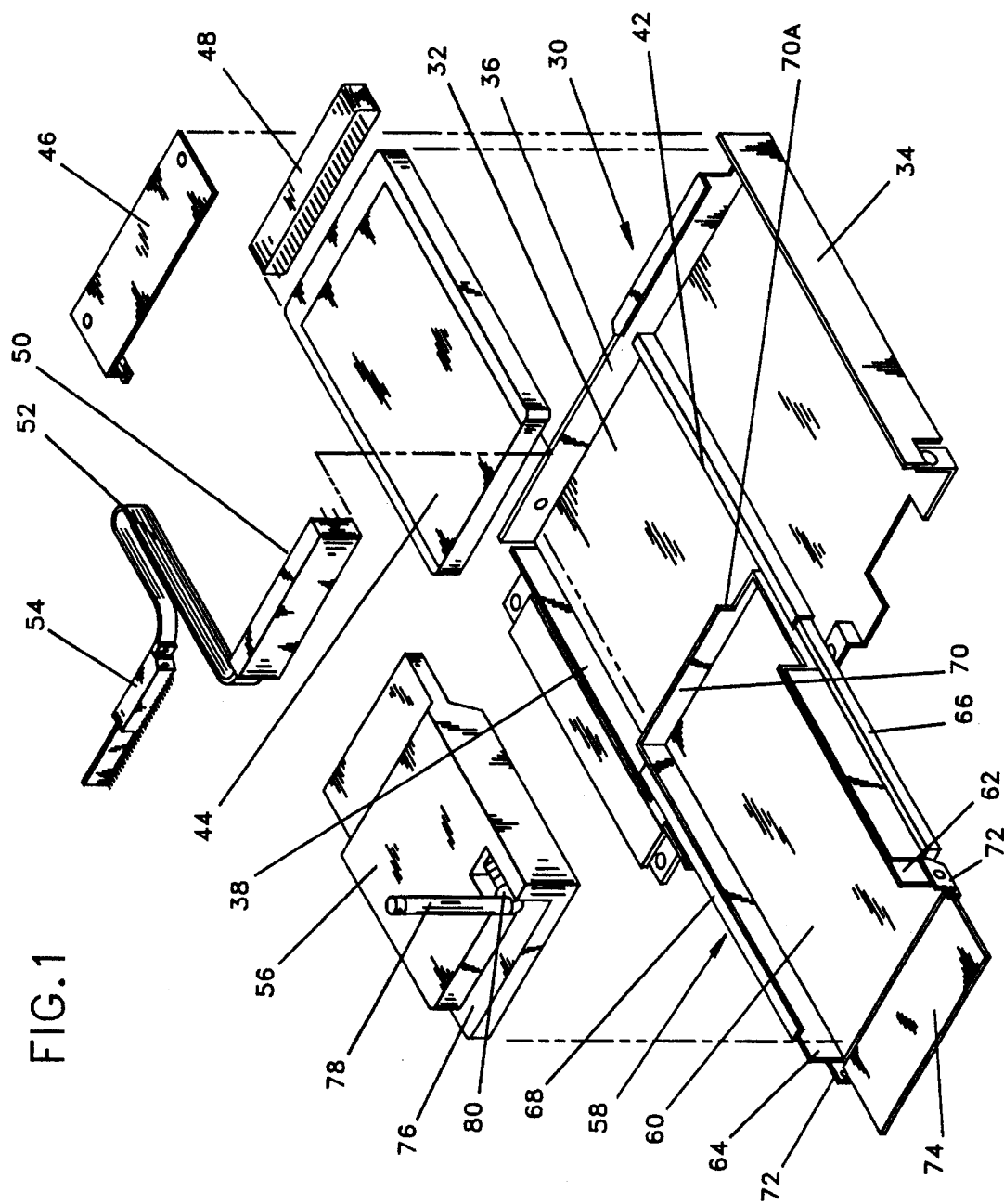
FIG. 1 is an exploded perspective view of the antenna housing according to one embodiment of the present invention.
Figure 2:
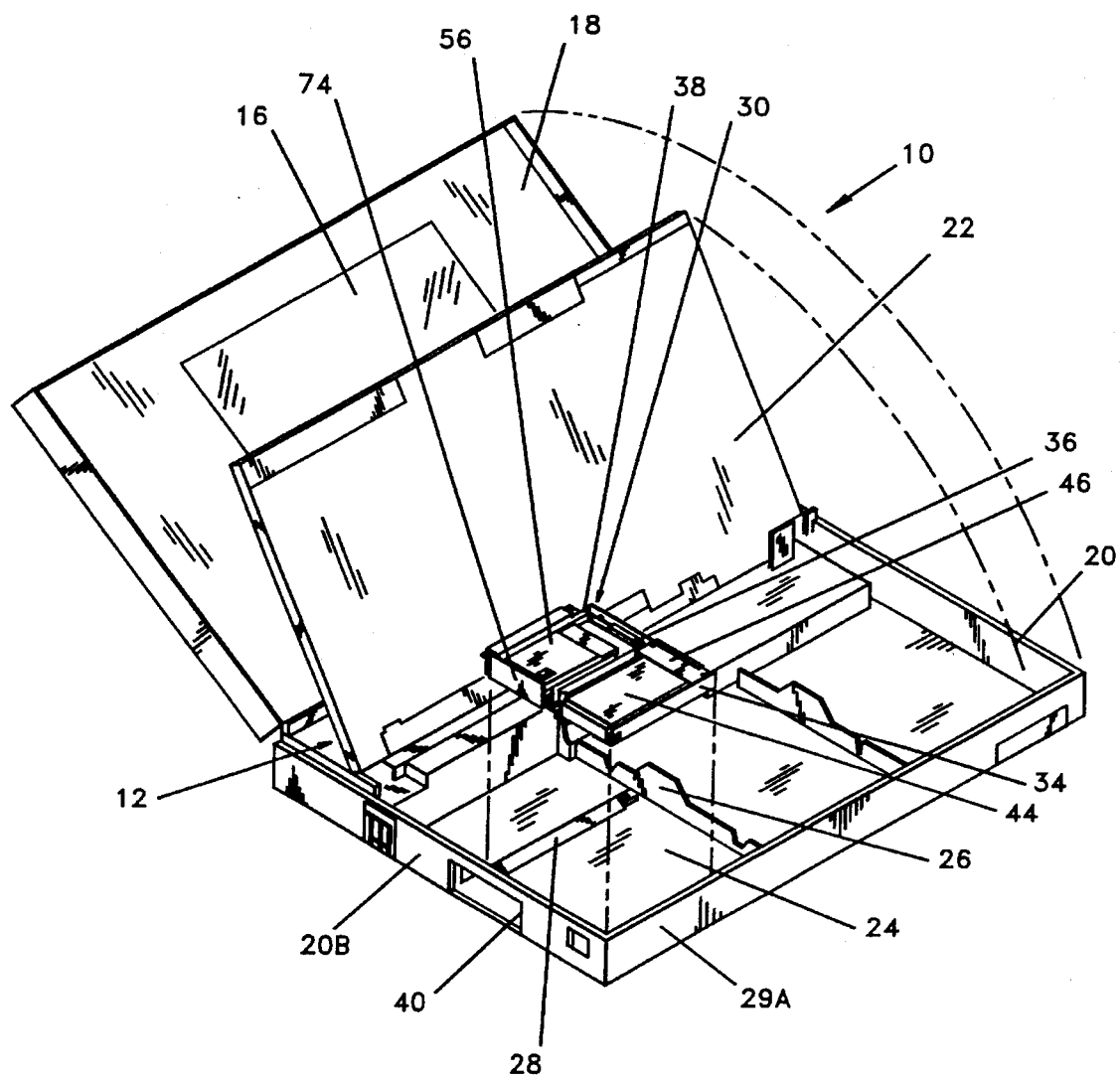
FIG. 2 is a perspective view of a notebook computer and the antenna housing of FIG. 1.

Referring to FIGS. 1 and 2, a portable personal computer 10 having an antenna housing according to one embodiment of the present invention includes a thin main body 12 and a cover 18 having a display 16. The cover 18 is hinged on the rear edge portion of the body 12 such that it can be opened and closed. The body 12 has a rectangular case 20 wherein various components, including a battery, are mounted. A keyboard 22 is mounted atop those components.

A compartment 24 is defined at one corner of the case assembly 20 by side walls 26 and 28. An antenna housing 30 is fitted into compartment 24. The antenna housing 30 comprises a bottom plate 32 and side walls 34, 36, and 38, which are attached to the outer edges of the bottom plate 32. Machine screws (not shown) securely fix the side walls 34, 36, and 38 to, respectively, the side plate 20A of the case assembly 20, and the side walls 26 and 28.

There is no side wall on the left end of the bottom plate 32, which remains open instead, and a slot 40 is formed in the side plate 20B to permit access to this opening in the left side of the antenna housing 30.

An angled guide plate 42 is attached to the bottom plate 32 of the housing 30 to divide the antenna housing 30 into two compartments. A digital circuit board 44 that includes a signal processing circuit is mounted on the side wall 34, and a connector 48 is held from the top by a cover 46. The digital circuit board 44 is connected at one end to the body 12 via the connector 48. A connector 50 that is connected to the other end of the digital circuit board 44 is connected via a cable 52 to a connector 54. The cable 52 is flexible and will not be damaged even if it is folded.

An analog circuit board 56 is located in the other compartment of the antenna housing 30, adjacent the digital circuit board 44, and is connected to the connector 54. The analog circuit board 56 is mounted in a shallow drawer 58. A bottom plate 60 of the drawer 58 slides across the bottom plate 32 of the antenna housing 30 to permit the extension of the analog circuit board 56.

Side walls 62 and 64 are provided along the longitudinal sides of the bottom plate 60. A guide member 66 is extended longitudinally along the external surface of the side wall 62, so that the drawer 58 is guided by the guide plate 42 and can be smoothly extended from the antenna housing 30. A stop (not shown) is provided at the rear end of the guide member 66, and abuts upon the guide plate 42 to prevent the drawer 58 from being extended too far. An extension plate 68 that extends inwardly is provided at the top of the side wall 64, and the upper corner of the analog circuit board 56 is guided by the extension plate 68. A notch 70A that is formed in a rear plate 70 of the drawer 58 serves as an opening for the cable 52. In other words, the analog circuit board 56 and drawer 58 can be extended from or retracted within the antenna housing 30, and the analog circuit board can also slide within the drawer 58.

A cover or door 74 is pivotally attached by hinges 72 to the end of the bottom plate 60 of the drawer 58. When the analog circuit board 56 is retracted within the antenna housing 30, the slot 40 of the side plate 20B can be closed by the door 74. The bottom plate 60 of the drawer 58 and the door 74, which are made of conductive materials, can serve as ground planes. A handle and a latch device (neither of them shown) are provided at the free end of the door 74. The door 74 can be opened by moving the handle, and when the door 74 is closed, the latch device functions to secure the door 74 to the side plate 20B.

One end of the analog circuit board 56 adjacent door 74 is recessed to form a step 76. Thus, when a pole antenna 78 is rotated down into the step 76, the antenna 78 will not strike the edge of the slot 40 when the analog circuit board 56 is retracted into the housing.

The base end of the pole antenna 78 is connected to the analog circuit board 56 via a ball joint 80 so that it can be pivoted. The entire analog circuit board 56 is electromagnetically shielded by a cover that is made of a conductive material and that also serves as a ground plane.

Figure 3:
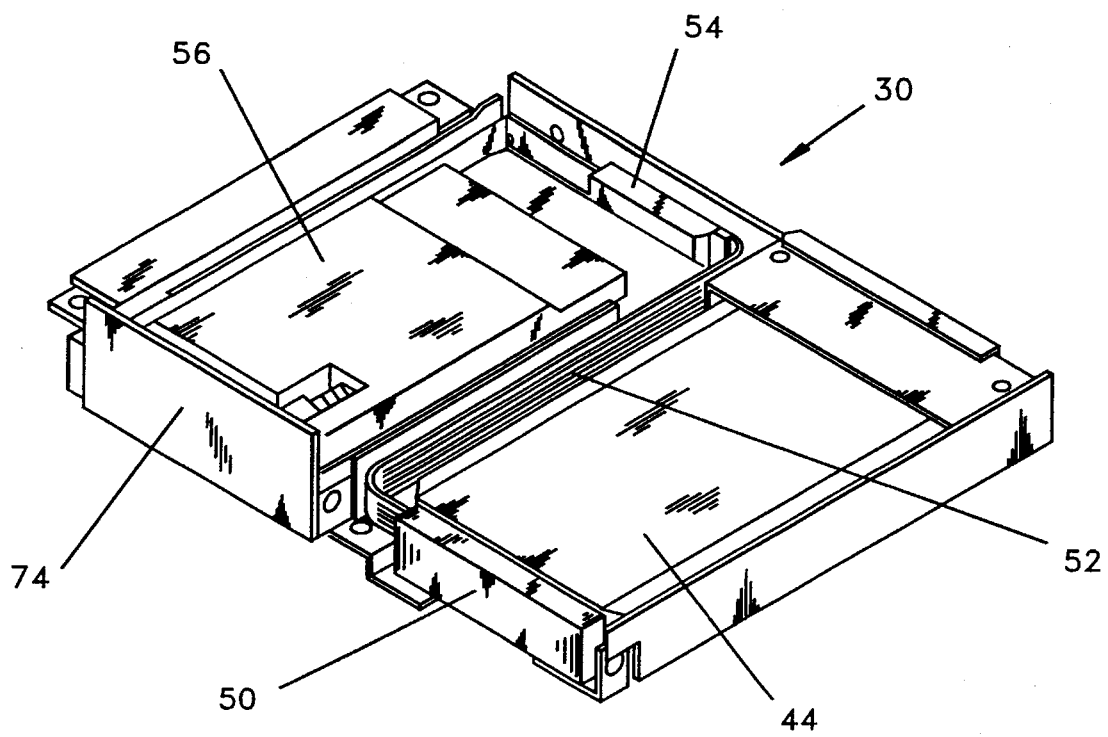
FIG. 3 is a perspective view of the computer housing of FIG. 1 with the drawer in the retracted position and the door closed.

In operation, and when there is no communication activity, the analog circuit board 56 is retracted within the housing 30, as is shown in FIG. 3. The door 74 covers the slot 40 and prevents dust from entering the body 12.

Figure 4:
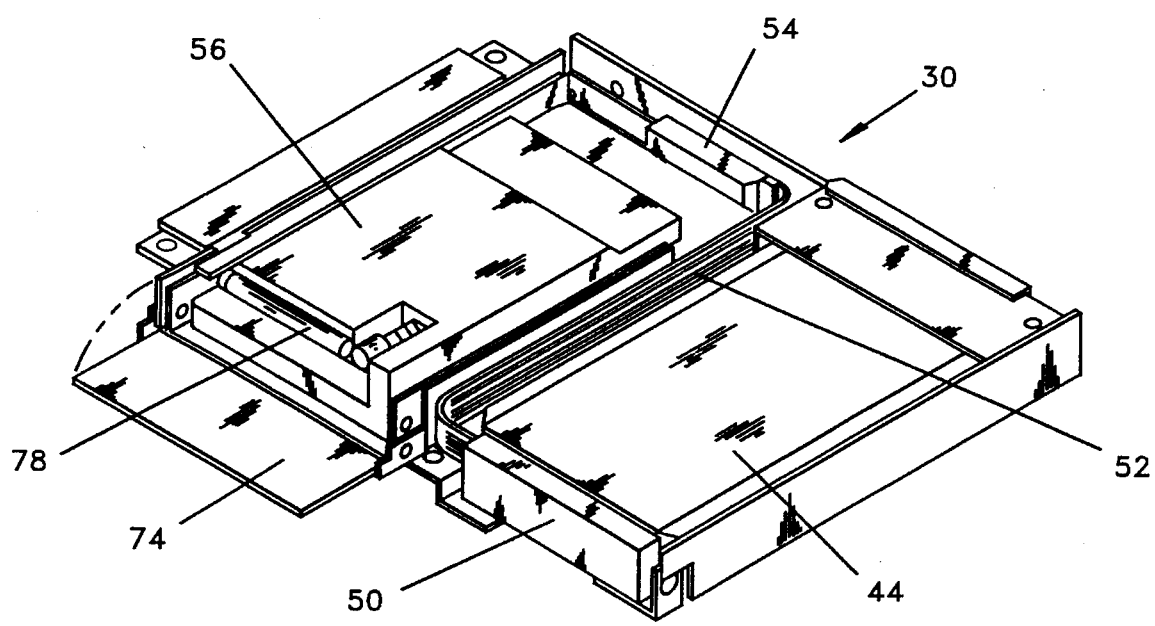
FIG. 4 is a perspective view of the antenna housing of FIG. 1 with the drawer in the retracted position and the door open.
Figure 5:
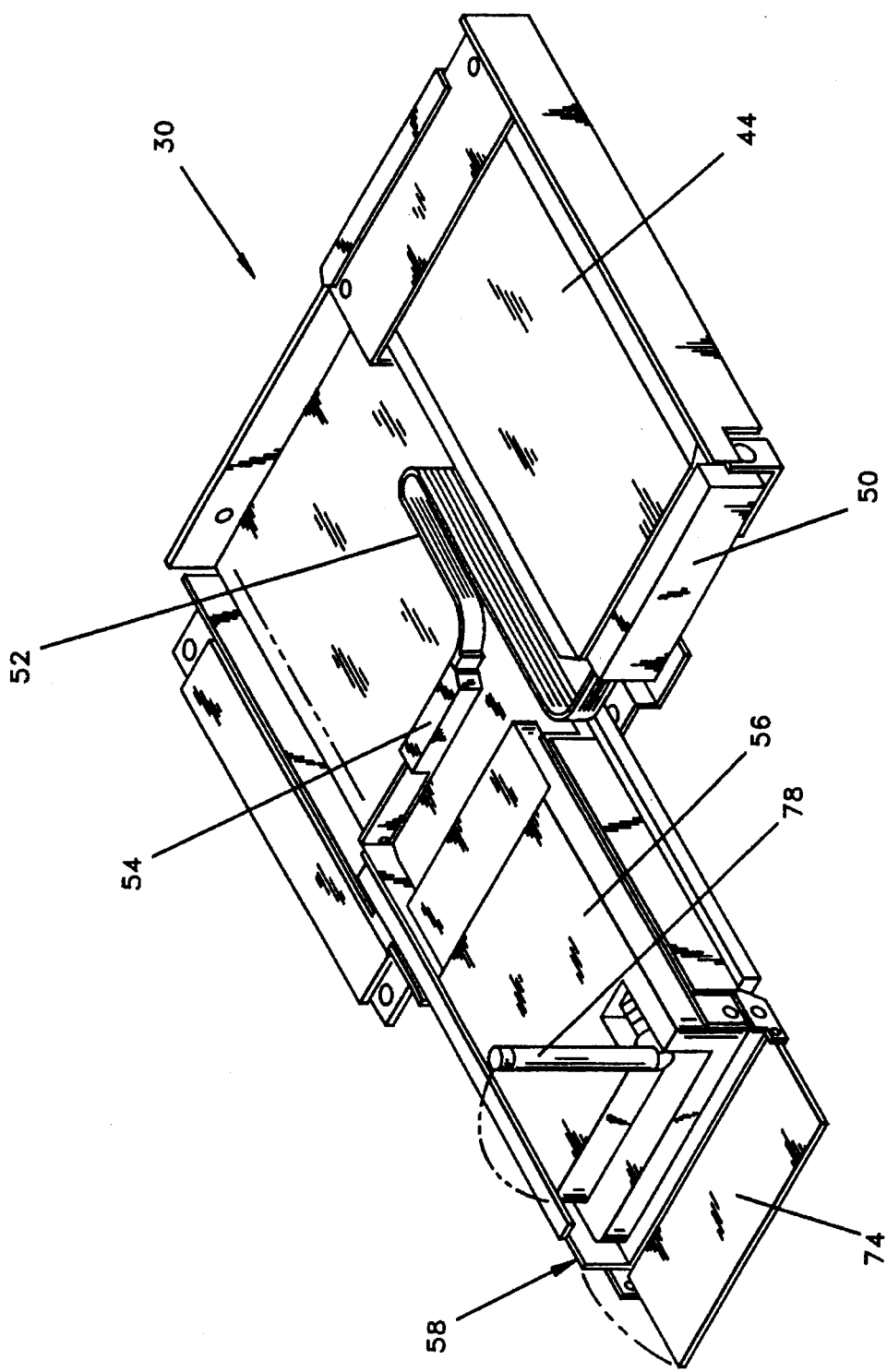
FIG. 5 is a perspective view of the antenna housing of FIG. 1 with the drawer in the extended position and the door open.

To communicate, the door 74 is opened and the drawer 58 is extended from the slot 40, as is shown in FIGS. 4 and 5. The analog circuit board 56, to which the pole antenna 78 is attached, is extended along with the drawer 58. Although folded, the cable 52 is flexible and is not damaged. Further, as the cable 52 is folded only at the center, the portions that are connected to the connectors 50 and 54 will not be flexed excessively.

When the pole antenna 78 is extended, the system is ready to communicate. Since the pole antenna 78 is located directly above the bottom plate 60 of the drawer 58 and the cover of the analog circuit board 56, both the bottom plate and cover function as ground planes. Furthermore, heat can be dissipated by exposing the analog circuit board 56 outside the body 12.

Figure 6:
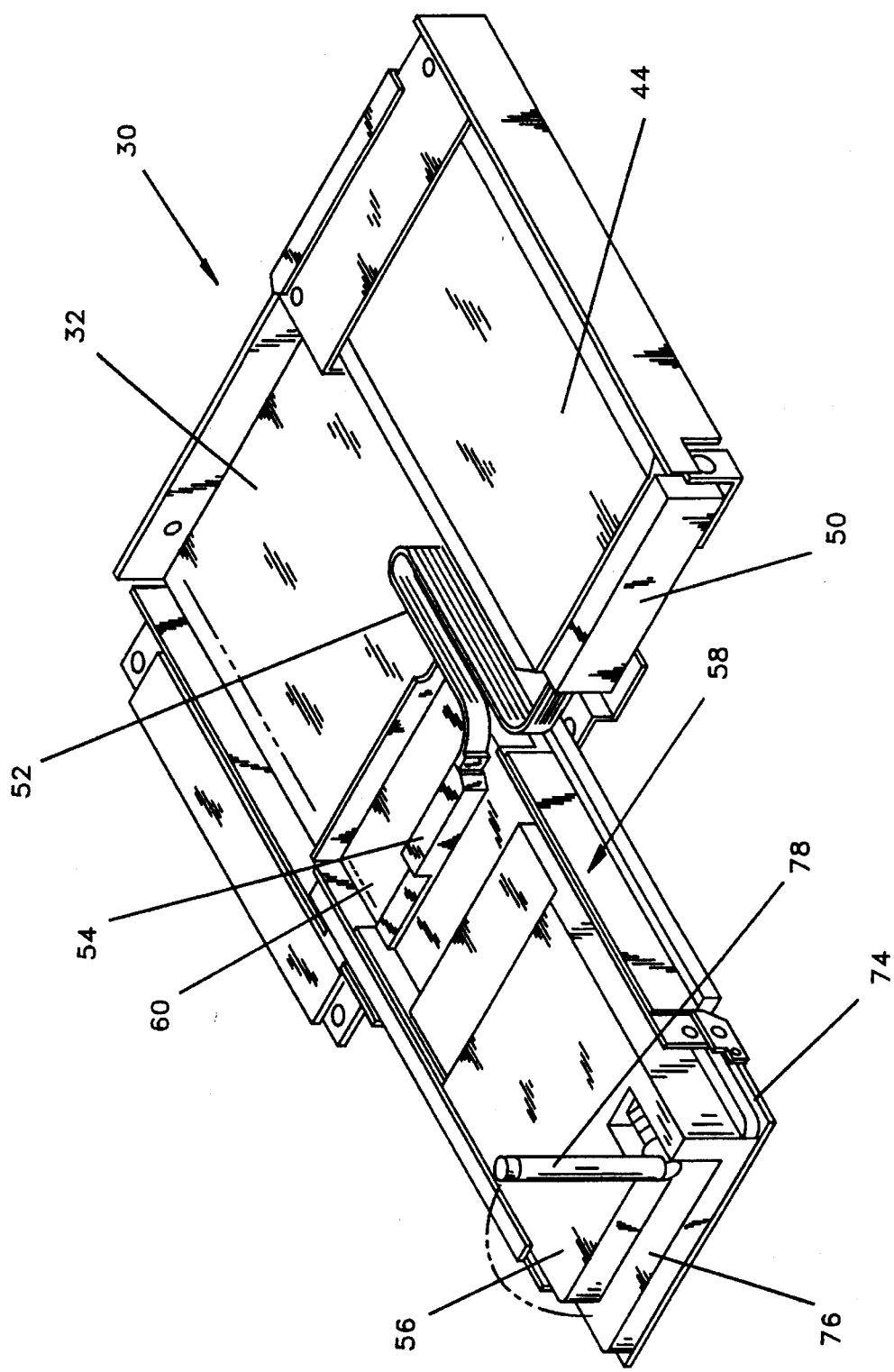
FIG. 6 is a perspective view of the antenna housing of FIG. 1 with the drawer in the extended position.

In addition, and as is shown in FIG. 6, the analog circuit board 56 slides across the bottom plate 60 and, since their relative positions are altered, the dimensions of the ground plane are variable. Moreover, since the cover 74 also serves as a ground plane when it is lying flat, the dimensions of the ground plane can be increased. When communication is finished, the pole antenna 78 can be rotated down and the analog circuit board 56 can be retracted along with the drawer 58 within the housing 30.

Figure 7:
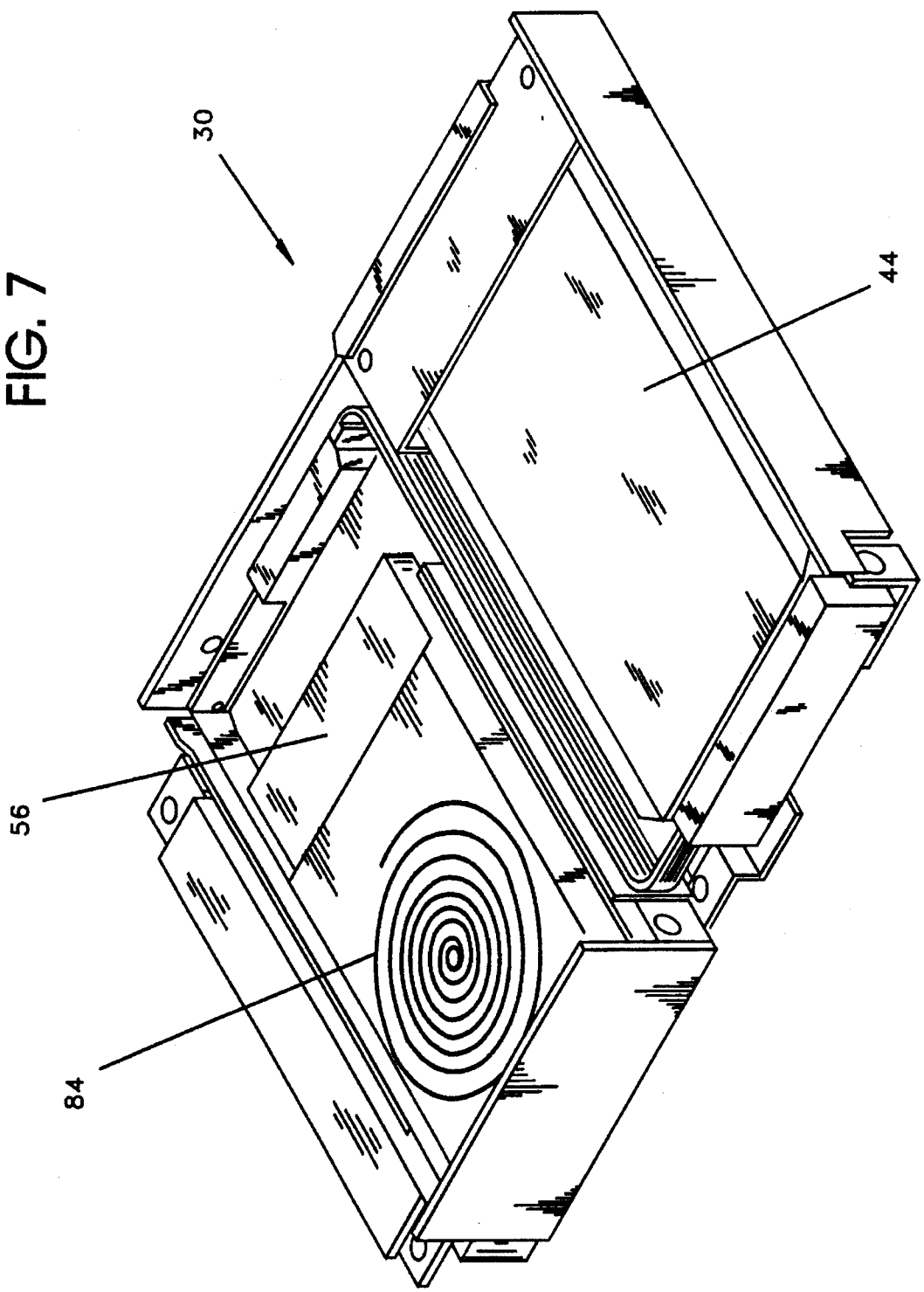
FIG. 7 is a perspective view of another embodiment of the present invention with the drawer retracted and employing a plane antenna.
Figure 8:
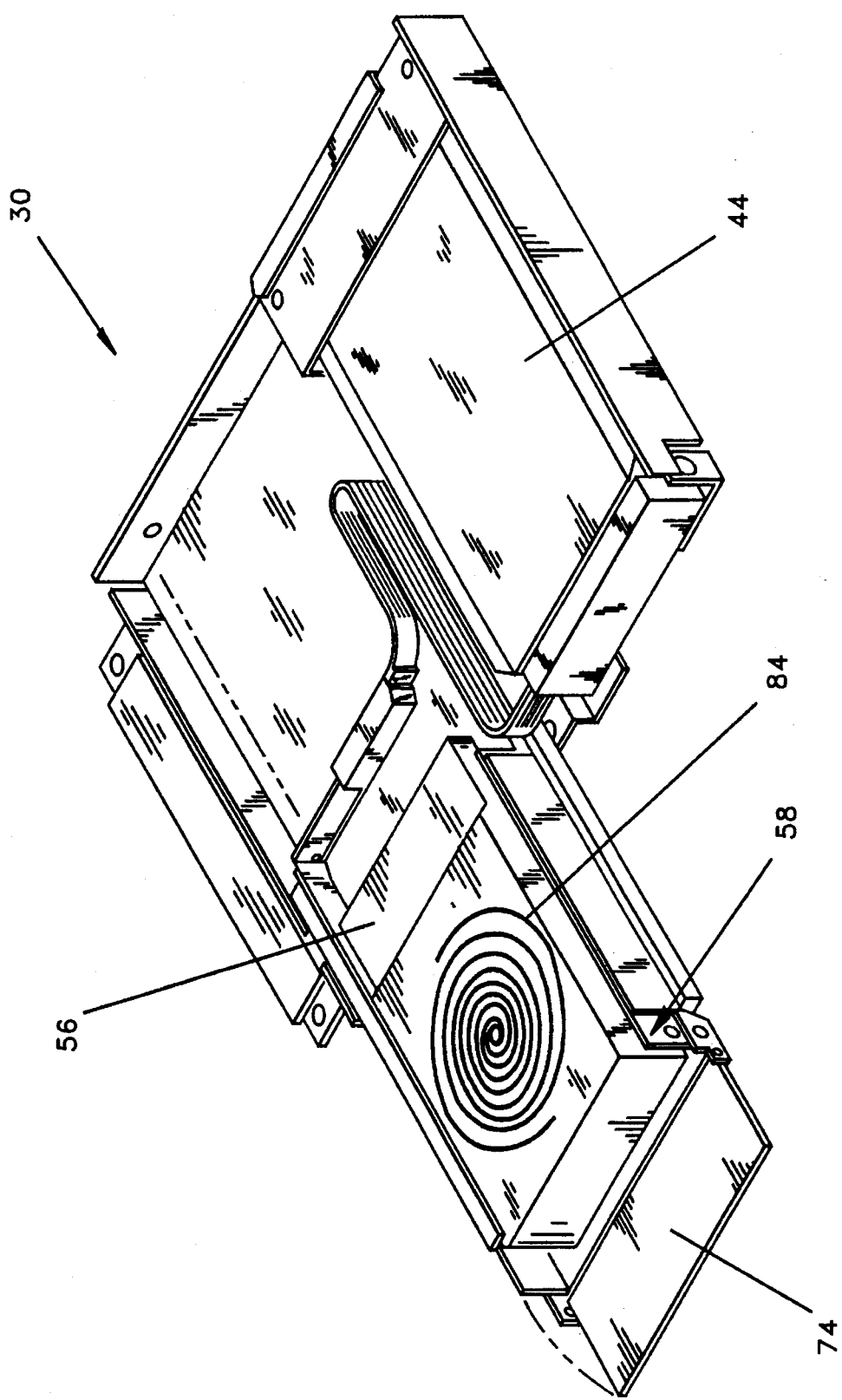
FIG. 8 is a perspective view of the antenna housing of FIG. 7 with the drawer extended.
Figure 9:
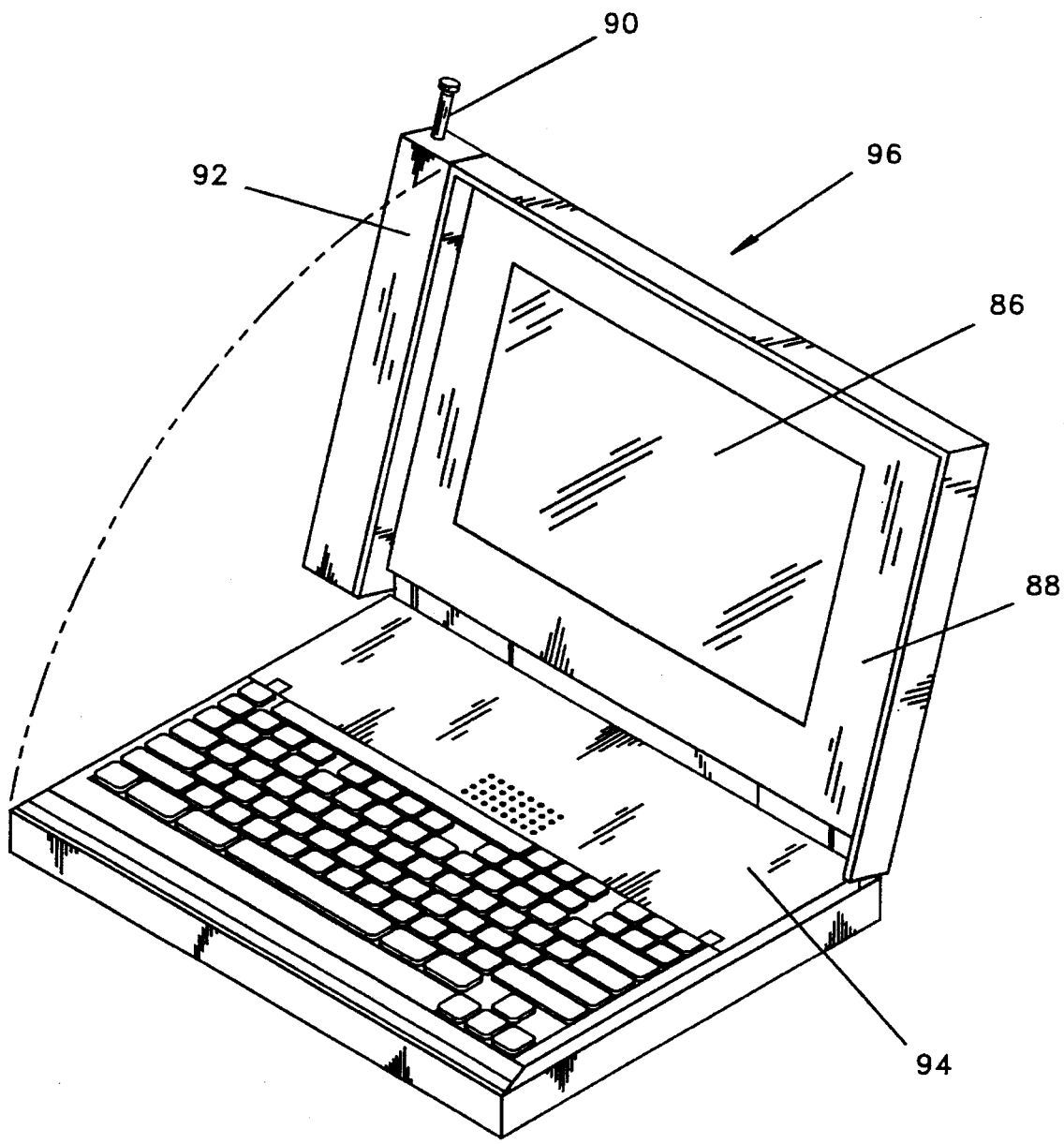
FIG. 9 is a perspective view of a notebook computer having a conventional antenna housing.
Figure 10:
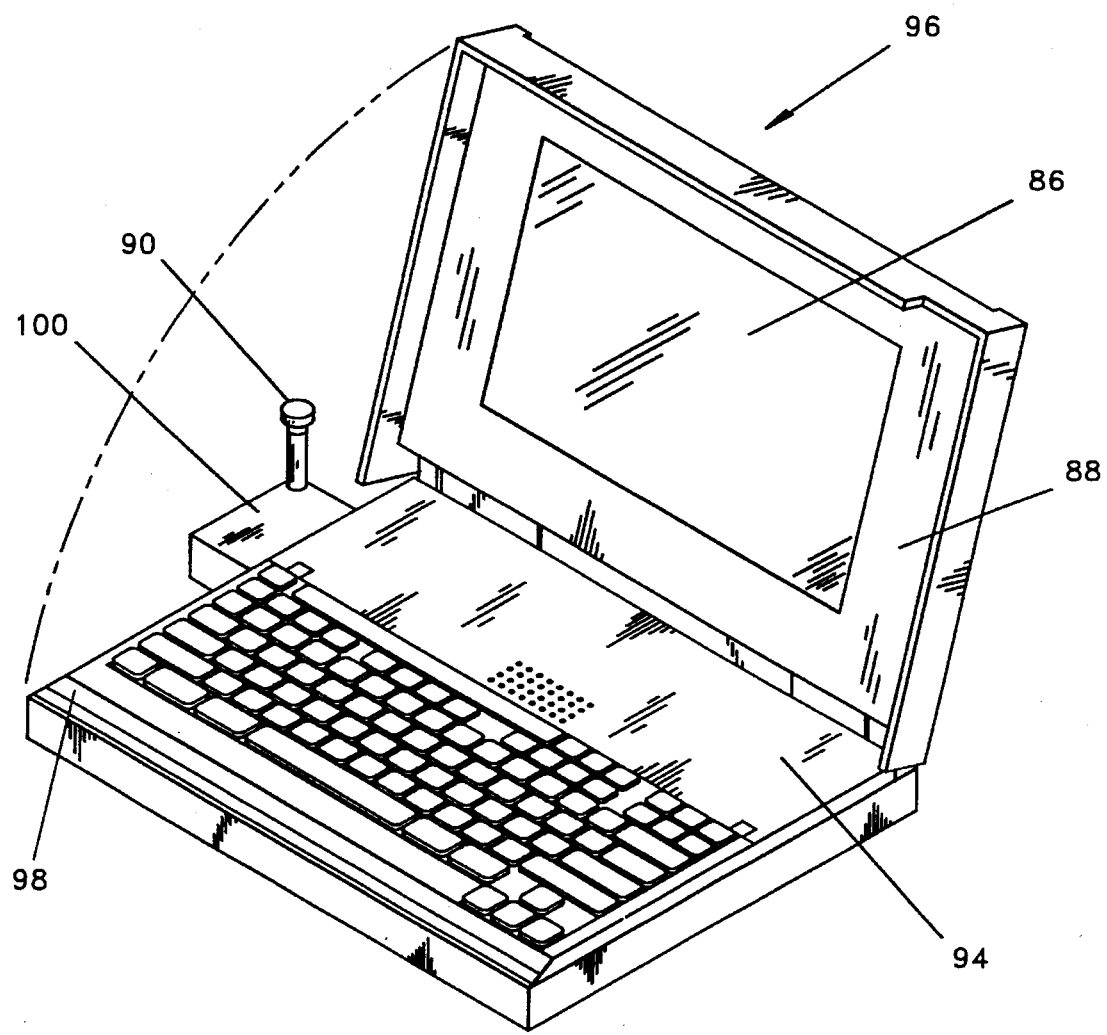
FIG. 10 is a perspective view of a notebook computer having another conventional antenna housing.

As illustrated in FIGS. 7 and 8, a plane antenna 84 that does not require a ground plane may be employed for wireless communication. In this embodiment, the plane antenna 84 is designed to be extended from, or retracted within, the housing 30.

We claim:

1. A computer having a wireless communication system, said computer comprising in combination:

a computer housing having an opening;

a drawer slidably attached to said computer housing, said drawer having an extended position projecting outwardly from said computer housing, and having a retracted position within said housing, said drawer passing through said opening in said housing when said drawer is moved from said retracted to said extended position; and an antenna attached to said drawer, said antenna being positioned exterior to said computer housing when said drawer is in said extended position, and said antenna being positioned within said computer housing when said drawer is in said retracted position, said antenna being positionable in an operating position when said drawer is in said extended position.

2. A computer having a wireless communication system, said computer comprising in combination:

a computer housing having an opening;

a drawer slidably attached to said computer housing, said drawer having an extended position projecting outwardly from said computer housing, and having a retracted position within said housing, said drawer passing through said opening in said housing when said drawer is moved from said retracted to said extended position, said drawer having a conductive ground plane surface;

a circuit board slidably attached to said drawer; and an antenna attached to said circuit board, said antenna being positioned exterior to said computer housing when said drawer is in said extended position, and said antenna being positioned within said computer housing when said drawer is in said retracted position;

said antenna being tunable by sliding said circuit board relative to said drawer, thereby varying the effective dimensions of said ground plane.

* * * * *